United States Patent
Ebiyama

(10) Patent No.: US 9,953,240 B2
(45) Date of Patent: Apr. 24, 2018

(54) IMAGE PROCESSING SYSTEM, IMAGE PROCESSING METHOD, AND RECORDING MEDIUM FOR DETECTING A STATIC OBJECT

(71) Applicant: NEC Corporation, Tokyo (JP)

(72) Inventor: Yukie Ebiyama, Tokyo (JP)

(73) Assignee: NEC Corporation, Tokyo (JP)

(*) Notice: Subject to any disclaimer, the term of this patent is extended or adjusted under 35 U.S.C. 154(b) by 109 days.

(21) Appl. No.: 14/894,143

(22) PCT Filed: Apr. 11, 2014

(86) PCT No.: PCT/JP2014/060493
§ 371 (c)(1),
(2) Date: Nov. 25, 2015

(87) PCT Pub. No.: WO2014/192441
PCT Pub. Date: Dec. 4, 2014

(65) Prior Publication Data
US 2016/0125268 A1 May 5, 2016

(30) Foreign Application Priority Data
May 31, 2013 (JP) .................. 2013-115544

(51) Int. Cl.
*G06K 9/00* (2006.01)
*G06K 9/62* (2006.01)
(Continued)

(52) U.S. Cl.
CPC ....... *G06K 9/6212* (2013.01); *G06K 9/00771* (2013.01); *G06K 9/4642* (2013.01);
(Continued)

(58) Field of Classification Search
CPC . G06T 2207/10016; G06T 2207/30232; G06T 7/254; G06T 7/194; G06T 7/20;
(Continued)

(56) References Cited

U.S. PATENT DOCUMENTS

2007/0280540 A1* 12/2007 Ikeda .................. G06K 9/38
382/195
2008/0247599 A1 10/2008 Porikli
(Continued)

FOREIGN PATENT DOCUMENTS

| JP | 2012-173987 | 9/2012 |
|----|-------------|--------|
| JP | 2012-191547 | 10/2012 |
| JP | 5058010 | 10/2012 |

OTHER PUBLICATIONS

International Search Report and Written Opinion dated Jun. 24, 2014 in corresponding PCT International Application.

*Primary Examiner* — Li Liu
(74) *Attorney, Agent, or Firm* — Finnegan, Henderson, Farabow, Garrett & Dunner, L.L.P.

(57) ABSTRACT

An image processing system includes: a first identification unit that identifies a static area from an input image captured at each of a plurality of time points; an image generation unit that generates a first image by using the static areas of respective input images captured in a first time span from a processing time point and generates a second image by using the static areas of respective images captured in a second time span from the processing time point; and a second identification unit that compares the first image and the second image and identifies an area having a difference.

9 Claims, 10 Drawing Sheets

(51) Int. Cl.
*G06K 9/46* (2006.01)
*G06T 7/254* (2017.01)

(52) U.S. Cl.
CPC .... *G06T 7/254* (2017.01); *G06T 2207/10016* (2013.01); *G06T 2207/30196* (2013.01); *G06T 2207/30232* (2013.01)

(58) Field of Classification Search
CPC ....... G06T 7/215; G06T 7/11; G06K 9/00771; G06K 9/3241; G06K 9/6212; G06K 9/3233
See application file for complete search history.

(56) References Cited

U.S. PATENT DOCUMENTS

| | | | |
|---|---|---|---|
| 2010/0231721 A1* | 9/2010 | Meloche | G08G 5/065 348/159 |
| 2013/0128050 A1* | 5/2013 | Aghdasi | H04N 7/181 348/158 |
| 2013/0188826 A1* | 7/2013 | Nishino | G06T 7/194 382/103 |
| 2014/0056473 A1* | 2/2014 | Tojo | G06K 9/3241 382/103 |
| 2014/0064566 A1* | 3/2014 | Shreve | G06K 9/00335 382/107 |
| 2015/0193661 A1* | 7/2015 | Fan | G06K 9/3241 382/103 |
| 2015/0310365 A1* | 10/2015 | Li | G06Q 10/0639 705/7.38 |
| 2017/0017845 A1* | 1/2017 | Bobbitt | G06K 9/00718 |

* cited by examiner

IMAGE PROCESSING SYSTEM, IMAGE PROCESSING METHOD, AND RECORDING MEDIUM FOR DETECTING A STATIC OBJECT

CROSS-REFERENCE TO RELATED PATENT APPLICATIONS

This application is a National Stage Entry of International Application No. PCT/JP2014/060493, filed Apr. 11, 2014, which claims priority from Japanese Patent Application No. 2013-115544, filed May 31, 2013. The entire contents of the above-referenced applications are expressly incorporated herein by reference.

TECHNICAL FIELD

Some aspects of the present invention relate to an image processing system, an image processing method, and a program.

BACKGROUND ART

Recent years have seen proposals of techniques for identifying a left-behind object or a person standing still for a certain period of time or longer (for example, refer to PTL 1) such as in video surveillance. In PTL 1, motions in a scene are analyzed at multiple time scales, and a long-term background model and a short-term background model are compared. Through this comparison, pixels corresponding mainly to a static background part, a dynamic foreground part, and a left-behind object standing still over a certain period of time, of the scene are differentiated.

CITATION LIST

Patent Literature

PTL 1: Japanese Patent Publication No. 5058010

SUMMARY OF INVENTION

Technical Problem

However, the technique described in PTL 1 has difficulty in generating an appropriate background model and hence appropriately detecting a left-behind object when a video includes constant changes, for example, frequent occurrence of a flow of people within a processing-target time scale.

Some aspects of the present invention have been made in view of the above-described problem, and one aim of the aspects is to provide an image processing system, an image processing method, and a program that are capable of appropriately detecting a static object.

Solution to Problem

An image processing system according to an exemplary aspect of the present invention includes: a first identification unit that identifies a static area from an input image captured at each of a plurality of time points; an image generation unit that generates a first image by using the static areas of respective input images captured in a first time span from a processing time point and generates a second image by using the static areas of respective images captured in a second time span from the processing time point; and a second identification unit that compares the first image and the second image and identifies an area having a difference.

An image processing method according to an exemplary aspect of the present invention performed by an image processing system, includes: a step of identifying a static area from an input image captured at each of a plurality of time points; a step of generating a first image by using the static areas of the respective input images captured in a first time span from a processing time point and generating a second image by using the static areas of the images captured in a second time span from the processing time point; and a step of comparing the first image and the second image and identifying an area having a difference.

A program according to an exemplary aspect of the present invention, causing a computer to carry out: a process of identifying a static area from an input image captured at each of a plurality of time points; a process of generating a first image by using the static areas of the respective input images captured in a first time span from a processing time point and generating a second image by using the static areas of the images captured in a second time span from the processing time point; and a process of comparing the first image and the second image and identifying an area having a difference.

In the present invention, "unit", "means", "device", and "system" do not simply mean physical means but include implementations of the functions of "unit", "means", "device", and "system" by software. In addition, the function of each of "unit", "means", "device", and "system" may be implemented by two or more physical means or devices, or the functions of two or more of "unit", "means", "device", and "system" may be implemented by a single physical means or device.

Advantageous Effects of Invention

The present invention can provide an image processing system, an image processing method, and a program that are capable of appropriately detecting a static object.

DESCRIPTION OF EMBODIMENTS

Figure 1:
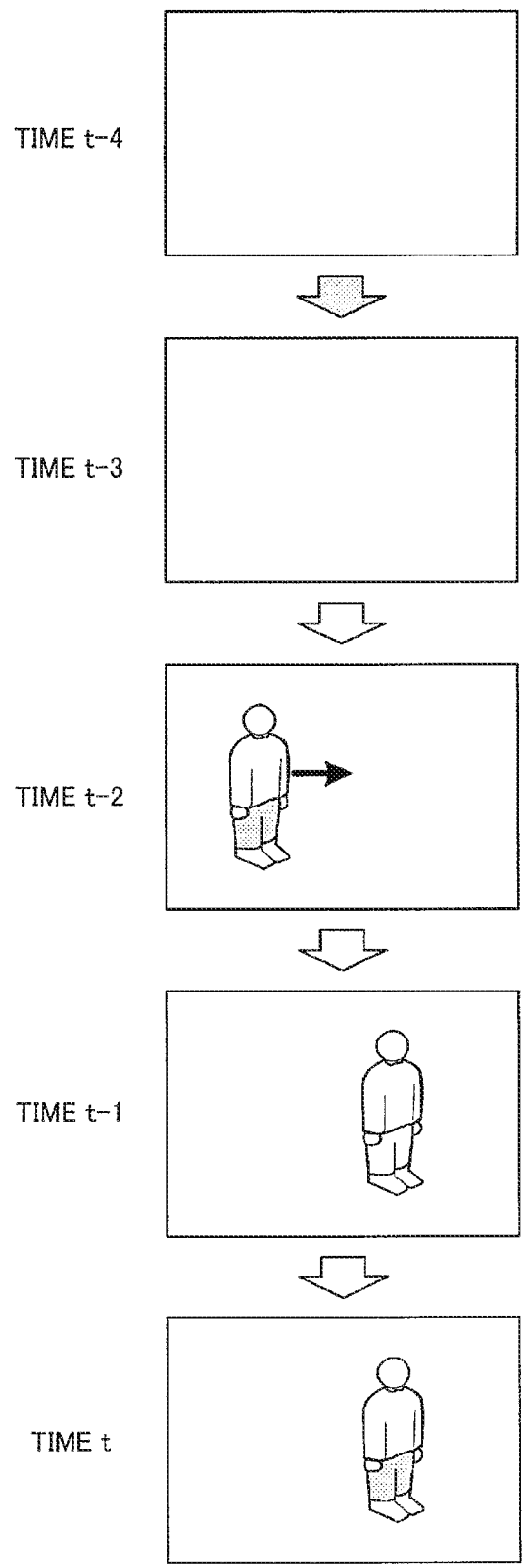
FIG. 1 is a diagram illustrating a concrete example of input images.

Exemplary embodiments of the present invention will be described below. In the description given below and the drawings to be referred to, the same or similar components are denoted by the same or similar reference signs.

1 First Exemplary Embodiment

FIGS. 1 to 8 are diagrams for illustrating a first exemplary embodiment. With reference to the drawings, this exemplary embodiment will be described below according to the following flow. First, in "1.1", an overview of a method of detecting a static object (which may be a person) according to this exemplary embodiment will be described. Subsequently, an overview of a functional configuration of an image processing system according to this exemplary embodiment will be described in "1.2", and a concrete example of extraction of a static object in each time window will be described in "1.3". A procedure of a process will be described in "1.4", and a concrete example of a hardware configuration capable of implementing the image processing system will be described in "1.5". Lastly, in "1.6" and the subsequent section, effects and other respects according to this exemplary embodiment will be described.

(1.1 Overview)

The image processing system according to this exemplary embodiment detects an object standing still (stopping) for a certain time period, from images captured, for example, by a security camera. Here, an "object" that can be detected by the image processing system may be of any kind such as any moving object, which may be a person or an animal, or an object left behind by a person.

Here, the following extraction is conceivable as an example. A background image is created, for example, by equalizing multiple images captured in a long term (referred to also as a long time window below). This background image is compared with a background image created by equalizing images captured in a shorter term (referred to also as a short time window below) that is shorter than the long term, to thereby extract an object included for a long time in the images in the short term. In this extraction, using an equalized image (background image) generated on the basis of images captured in a certain time period reduces the influence of moving objects (may be a person) that, for example, move out from the frames in a moment, which facilitates extracting a static object. In this exemplary embodiment, an image generated on the basis of multiple images and hence having little influence of moving objects is referred to as a background image.

In such a technique, however, when a flow of people constantly occurs, an influence of the flow of people remains largely even after equalization of captured images, for example. This influence may cause a difference in the state of integration of the flow of people into the background between the image of the long time window and the image of the short time window and may consequently increase failure in detecting static objects and erroneous detection of static objects.

In view of this, this exemplary embodiment first separates an area corresponding to a moving object (referred to also as "foreground area" below) and the other, static area (referred to also as "background area" below; a "static area" indicates not only an area including no motion at all but also an area including motion indicating a value smaller than a threshold value) of each captured image. The static areas of the respective captured images are then equalized in a time direction to generate a background image. In this way, the area including a flow of people, if occurring, is included in a foreground area, which consequently reduces an influence of such a flow of people on the generated background image. By comparing the background image of a long time window and the background image of a short time window, a static object (an object standing still for a long time) can appropriately be detected. A concrete example of a procedure of this process will be described below with reference to FIGS. 1 to 3.

FIG. 1 is a diagram illustrating a concrete example of input images captured respectively at Times t−4 to t. Here, no one is included in the images captured at the Times t−4 and t−3, whereas a person is included in the images captured at Times t−2 to t. Additionally, the person is moving in the image of Time t−2, whereas the person is standing still in the images of Times t−1 and t.

Figure 2:
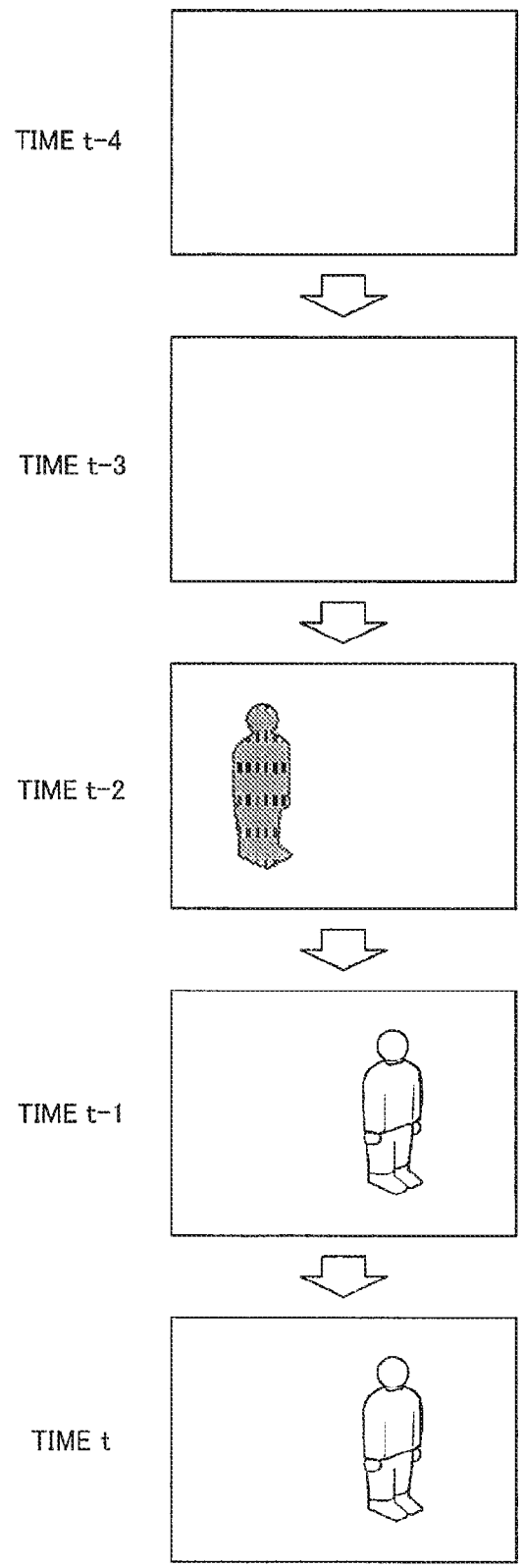
FIG. 2 is a diagram illustrating a concrete example of a background area identified from the input images.

The image processing system according to this exemplary embodiment separates a moving area (foreground area) and a static area (background area) of each of the input images as those illustrated in FIG. 1. FIG. 2 is a diagram illustrating an example of images in the case of extracting only a static area from each of the input images in FIG. 1.

Since the person is moving in the image of Time t−2 as mentioned above, the area including the person is a moving area and is hence excluded from the image. The other images, which include no moving area and each of which is hence a static area as a whole, have no change from the corresponding input images.

Figure 3:
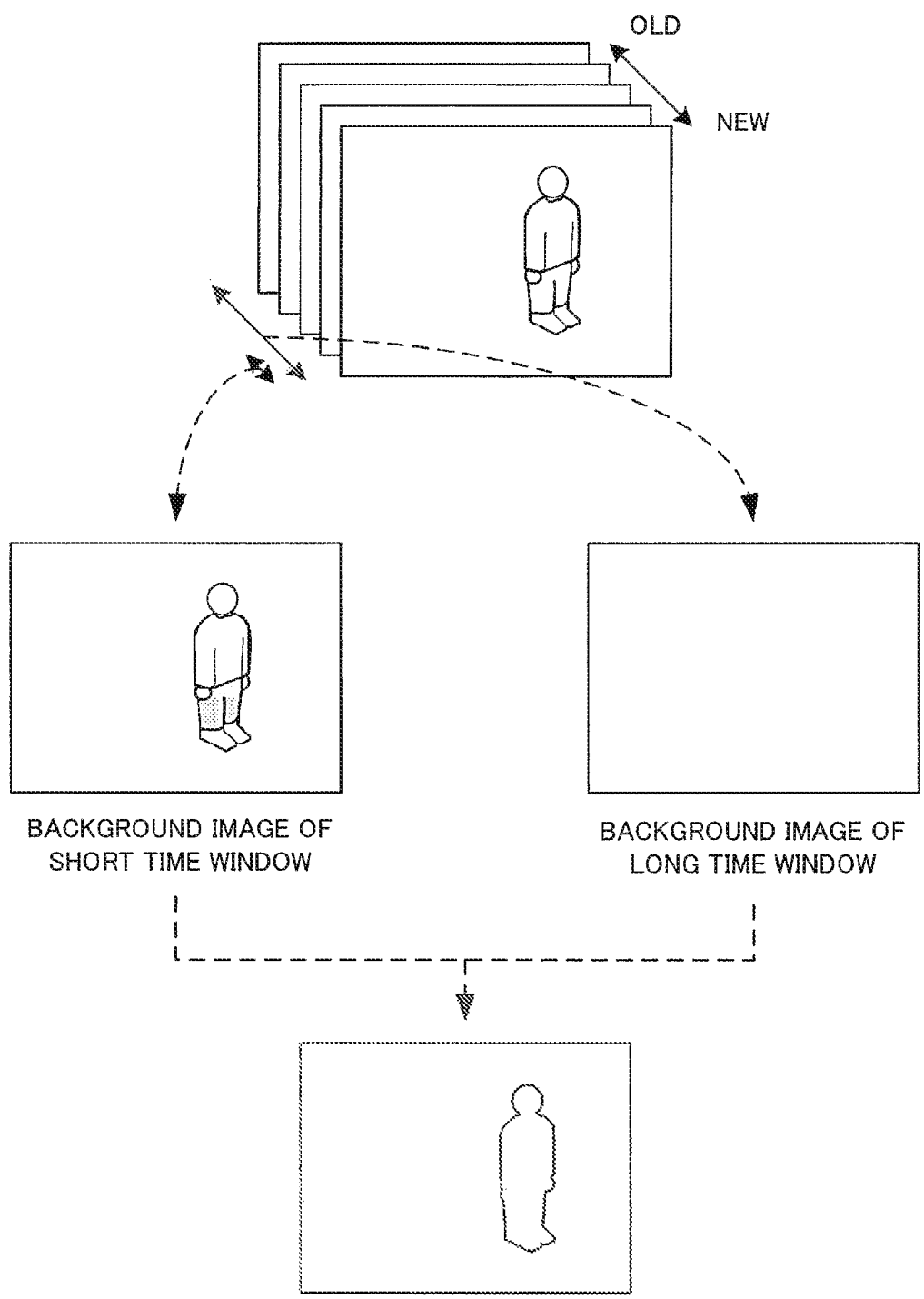
FIG. 3 is a diagram illustrating a concrete example of a method of generating background images.

As illustrated in FIG. 3, the image processing system according to this exemplary embodiment generates a background image of each of multiple time windows, on the basis of the images obtained by extracting only static areas. This background image may be generated by obtaining, for each of the pixels of the background image, the average, median, or mode of the corresponding pixel values of the static areas of the respective images captured in a certain time period from the time point before current Time t to current Time t. The image processing system compares background images of a short time window and a long time window, extracts pixels each having a difference that is larger than a threshold value, and consequently identifies the area consisting of the pixels as a static-object area.

In the example in FIG. 3, no one is included in the background image of the long time window. This is because the influence of the person included for a short time is reduced by use of, for example, the mode or median of the pixel values of each pixel for generating the background image.

1.2 Overview of System

Figure 4:
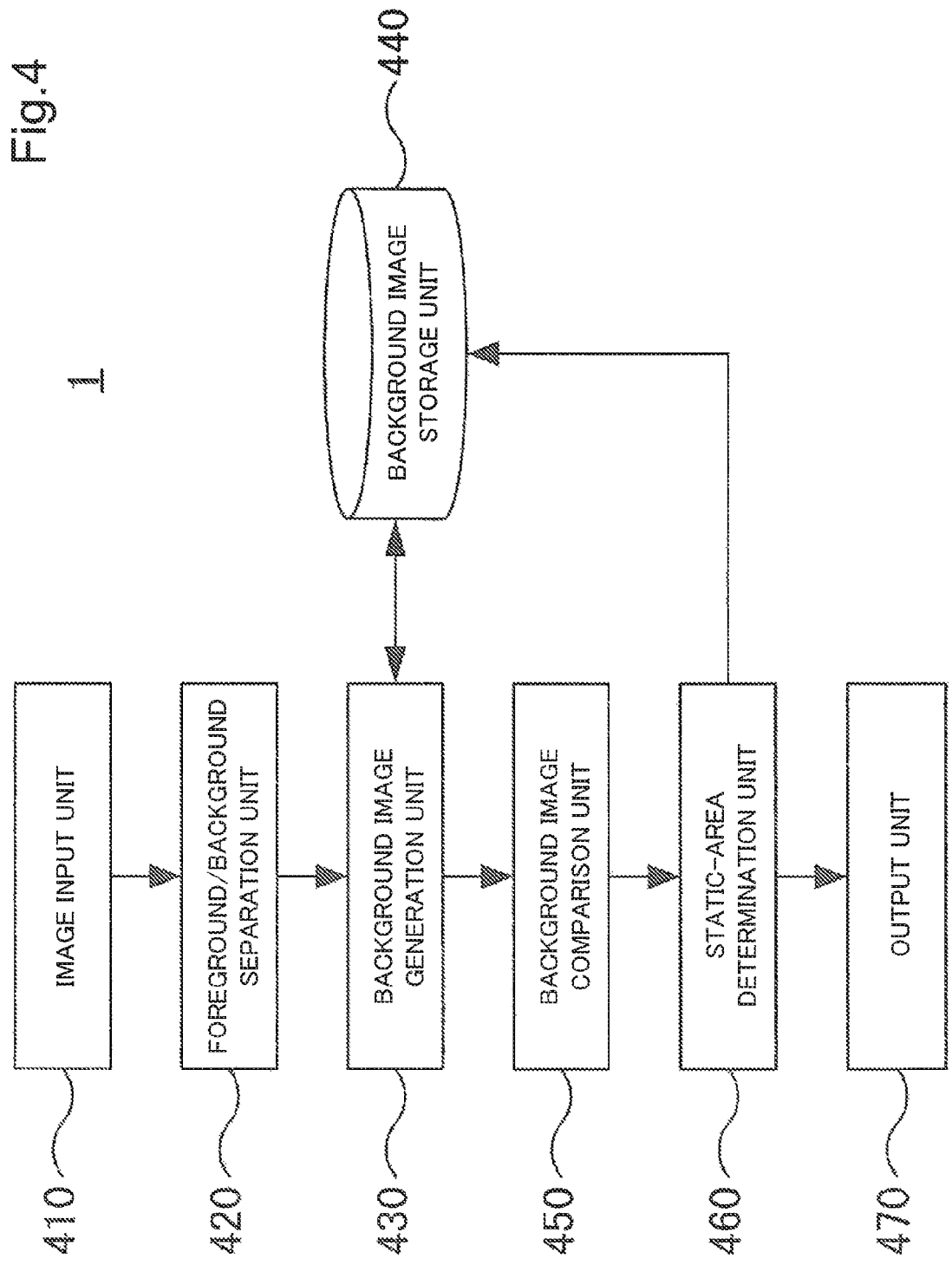
FIG. 4 is a functional block diagram illustrating a schematic configuration of an image processing system according to a first exemplary embodiment.

A system configuration of an image processing system 1 according to this exemplary embodiment will be described with reference to FIG. 4. FIG. 4 is a block diagram illustrating a system configuration of the image processing system 1.

The image processing system 1 includes an image input unit 410, a foreground/background separation unit 420, a background image generation unit 430, a background image storage unit 440, a background image comparison unit 450, a static-area determination unit 460, and an output unit 470.

The image input unit 410 sequentially receives an input of a frame image included in a video input by an unillustrated image capturing device, such as a security camera. The frame images are captured at different time points. Alternatively, the image input unit 410 may receive inputs of frame images obtained by decoding video data stored in an unillustrated hard disk drive (HDD) or a video cassette recorder (VCR).

The foreground/background separation unit 420 sequentially separates a foreground area and a background area of each of the input images input by the image input unit 410 by using, for example, the background differencing method or the optical flow. Here, a foreground area is an area of the image including motion, whereas a background area is an area of the image including no motion (being static). Here, whether motion is included or not can be determined depending on whether the area includes motion indicating a value exceeding a threshold value. The threshold value used for determination on motion may change according to a detection-target static object. Specifically, for example, when a rigid body such as a left-behind suitcase is a detection target, the area involving no motion at all in the image can be set as a background area, and the remaining area can be set as a foreground area. In contrast, when a non-rigid body such as a person or a plastic bag is a detection target, the area having a variation smaller than a predetermined threshold value can be set as a background area regardless of any change in appearance in the image due to slight movement, change in posture, or change in shape, and the remaining area can be set as a foreground area. Hence, a "static area" means not only an area including no motion at all but also an area including motion indicating an amount smaller than a threshold value. This threshold value may take different values depending on the detection target.

In a technique using an optical flow for separating a dynamic foreground area and a static background area, a block including motion is identified, for example, by comparing a target frame and a previous frame on a macroblock-by-macroblock. More specifically, the block is identified, for example, by identifying the position of a macroblock similar to each of the macroblocks (sets of pixels) in a processing-target image, in the image captured immediately before the processing-target image (block matching).

In the case of employing the background differencing method, a moving object is identified by obtaining the difference between a background image acquired in advance and a processing-target image through comparison.

The background image generation unit 430 generates a background image by use of the background area (image of the static area) extracted by the foreground/background separation unit 420 and the background areas of the images captured in multiple predetermined time windows stored in the background image storage unit 440. To generate the background image, the background image generation unit 430 may calculate the average, median, or mode of the pixel values obtained at each of the pixel positions in the background areas of the images corresponding to each time window. If the ratio of the number of background pixels extracted by the foreground/background separation unit 420 to those corresponding to the length of each of the predetermined time windows is smaller than a predetermined ratio, the corresponding area may be excluded from the subsequent process due to lack of information sufficient for generating a reliable background.

To generate a background of the longest time window (generate a background image assumed to consist of a genuine background), the background image generation unit 430 may calculate the average, median, or mode of the pixel values of the background areas excluding the static areas, by use of static-area information (e.g., a mask image) stored in the background image storage unit 440 with the background image. This is because, in the case of a security video, for example, at a platform, bus stop, checkout counter, ticket vending machine, or automated teller machine (ATM), where people sequentially appear and temporally stop at respective positions, a genuine background image may not be generated by directly using the background area extracted by the foreground/background separation unit 420. The static-area information (e.g., a mask image) is created by the static-area determination unit 460 as will be described below.

Here, the background image storage unit 440 stores the images of the background areas sequentially extracted from the respective input images corresponding to a certain time period by the foreground/background separation unit 420. The background image storage unit 440 may store static-area information (e.g., a mask image) corresponding to the images of the certain time period generated by the static-area determination unit 460.

Alternatively, the background image storage unit 440 may store the background image of each time window generated by the background image generation unit 430, at the timing of processing by the background image generation unit 430.

The background image comparison unit 450 compares the background images generated on the basis of the respective time windows by the background image generation unit 430. More specifically, the background image comparison unit 450 compares the background image generated on the basis of the longest time window (the background image assumed to consist of a genuine background) and the background image generated on the basis of a time window shorter than the longest time window, and thereby detects a static object standing still for a certain time period. In this detection, the background image comparison unit 450 may detect a static object categorized according to the time length of being static, by generating background images on the basis of backgrounds of multiple time windows. This method will be described later with reference to FIGS. 5 and 6.

Examples of a method by which the background image comparison unit 450 compares background images are: a method of using the absolute value of the difference in pixel values between background images; a method of calculating, while scanning small rectangle areas on the images, correlation between the pixel values in the rectangle areas; and a method of calculating the histogram distance of the pixel values in the rectangle areas. In the methods using rectangle areas, a certain size, such as a macroblock, may be set, or different sizes may be set for different areas of the images by use of camera parameters by taking into account the appearance size of a detection-target object in the images (for example, a larger rectangle area is set for an image area including a front part, and a small rectangle area is set for an image area including a rear part).

The static-area determination unit 460 identifies each pixel having, for example, a difference exceeding a threshold value, from the result of the comparison by the background image comparison unit 450, and determines each pixel area consisting of such pixels as a static area. In this determination, when the characteristics, such as the size or shape, of a detection-target object are known, pixel areas not matching the characteristics may be excluded.

When the static-area determination unit 460 determines a pixel area as a static area, the static-area determination unit 460 stores, in the background image storage unit 440, information (e.g., a mask image) indicating that a static object exists in the pixel area in association with the latest background image stored in the background image storage unit 440.

The output unit 470 outputs information on the pixel area determined by the static-area determination unit 460 (information on the area including a static object) to an external module.

1.3 Concrete Example of Extraction of Static Object Based on Time Windows

A concrete example of extraction of a static object based on time windows will be described with reference to FIGS. 5 and 6.

When background images are generated on the basis of multiple different time windows, the background image generated from a short time window includes a genuine background (background including no moving object at all) and all the objects including objects standing still for a short time and objects standing still for a long time. In contrast, the background image generated from a long time window includes the genuine background and the objects standing still for a long time, and the background image generated from the longest time window includes only the genuine background. In other words, the background image of any of the time windows includes the genuine background and all the detected objects standing still for different time periods (static objects standing still for certain time periods).

In contrast, when only two fixed time windows, a long time window and a short time window, are used, it is difficult to generate an image including a genuine background image and all detection targets standing still for different time periods. For example, assume that a background images are generated on the basis of two time windows, i.e., a long time window corresponding to 15 minutes and a short time window corresponding to five minutes. In this case, a target standing still for about five minutes is detected without any problem. However, a target standing still for a long time, for example, longer than 10 minutes, is included in both of the background images of the long time window and the short time window, and hence detection of the target is likely to fail. Additionally, a target standing still for a short time, e.g., about one minute, is included in neither of the background images of the long time window and the short time window. In such a case, where the long time window and the short time window have no difference, no difference is found with respect to the area actually including a static object through subsequent comparison by the background image comparison unit 450, and hence the object is not successfully detected as a static object.

In view of this problem, the background image generation unit 430 according to this exemplary embodiment sets time windows on the basis of the lengths of the static time periods of static objects to be extracted.

Figure 5:
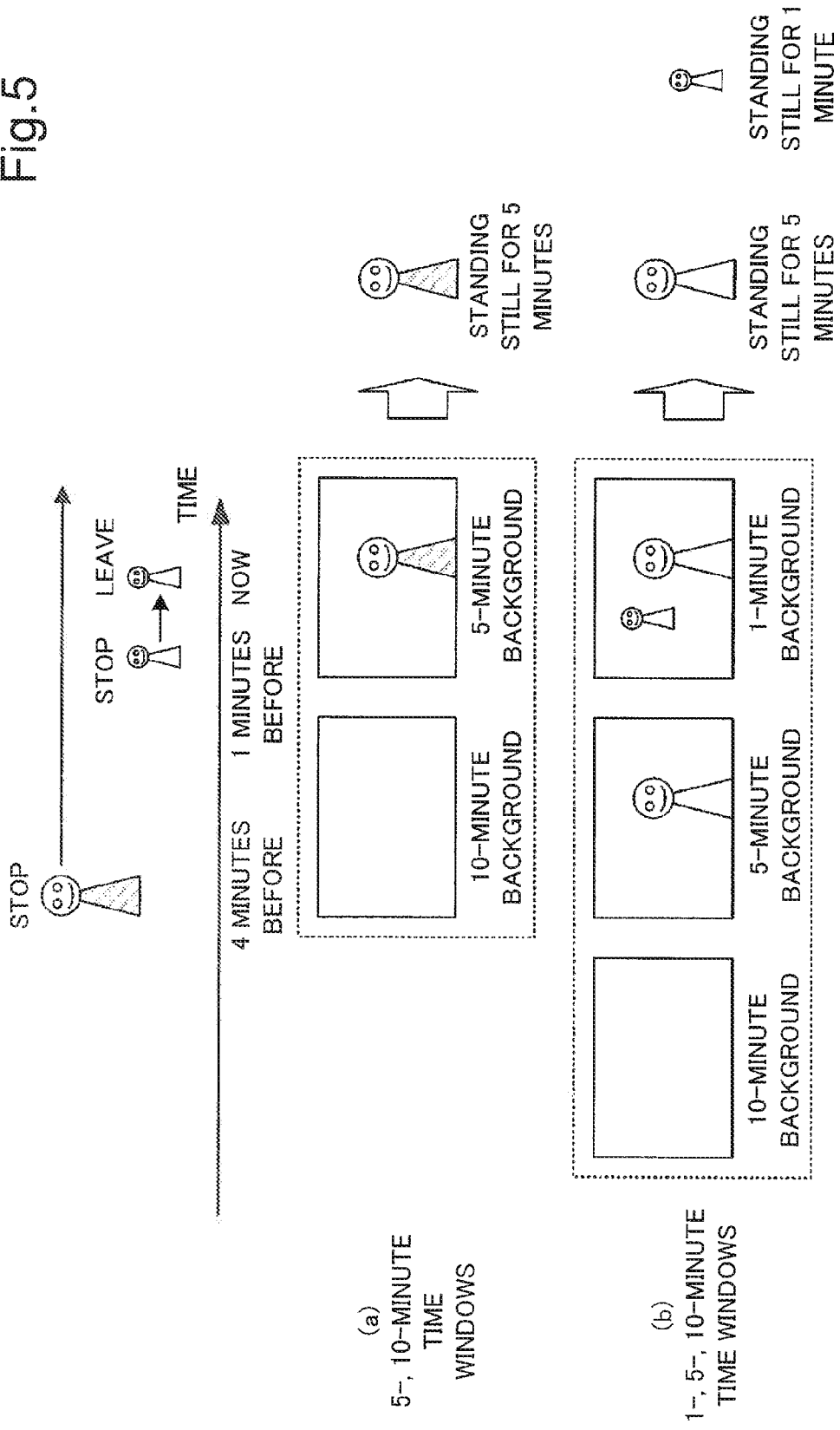
FIG. 5 is a diagram for illustrating a concrete example of a static-object detection in each time window.

As illustrated in FIG. 5, assume a video including a person standing still from four minutes before the current time point (processing time point) to the current time point and another person standing still from one minute before the current time point to the current time point.

Here, when background images are created on the basis of a time window from 10 minutes before the current time point and a time window from five minutes before the current time point, as illustrated in (a), no one is included in the background image generated from the 10-minute time window, and the person standing still (being static) from four minutes before the current time point is included in the background image generated from the five-minute time window. However, the person standing still from one minute before the current time point is included in neither of the images. This is because, when a background image is created, for example, by use of the mode of the pixel values of each pixel, an object included in more than half of the images captured in the corresponding time window is included in the background image.

For this reason, the static object standing still from one minute before the current time point is not detected in the case based on the 10-minute time window and the five-minute time window.

In contrast, when background images are created on the basis of three time windows, i.e., a time window from 10 minutes before the current time point, a time window from five minutes before the current time point, and a time window from one minute before the current time, as illustrated in (b), the person standing still from one minute before the current time point is included in the background image of the one-minute time window.

Hence, generating a background image from one-minute window enables successful detection of the person (object) standing still for one minute or longer to the current time point.

Figure 6:
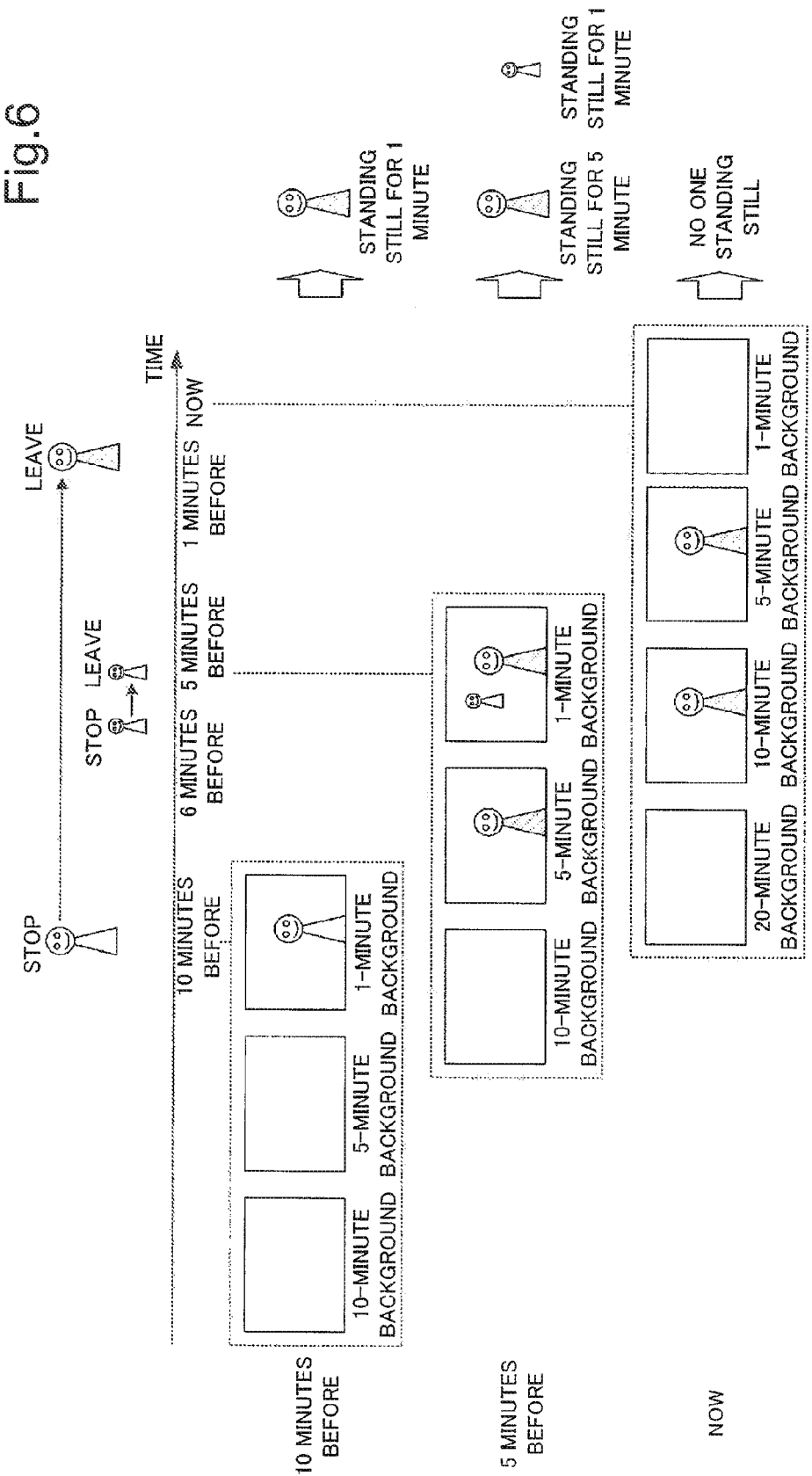
FIG. 6 is a diagram for illustrating a concrete example of static-object detection in each time window.
Figure 7:
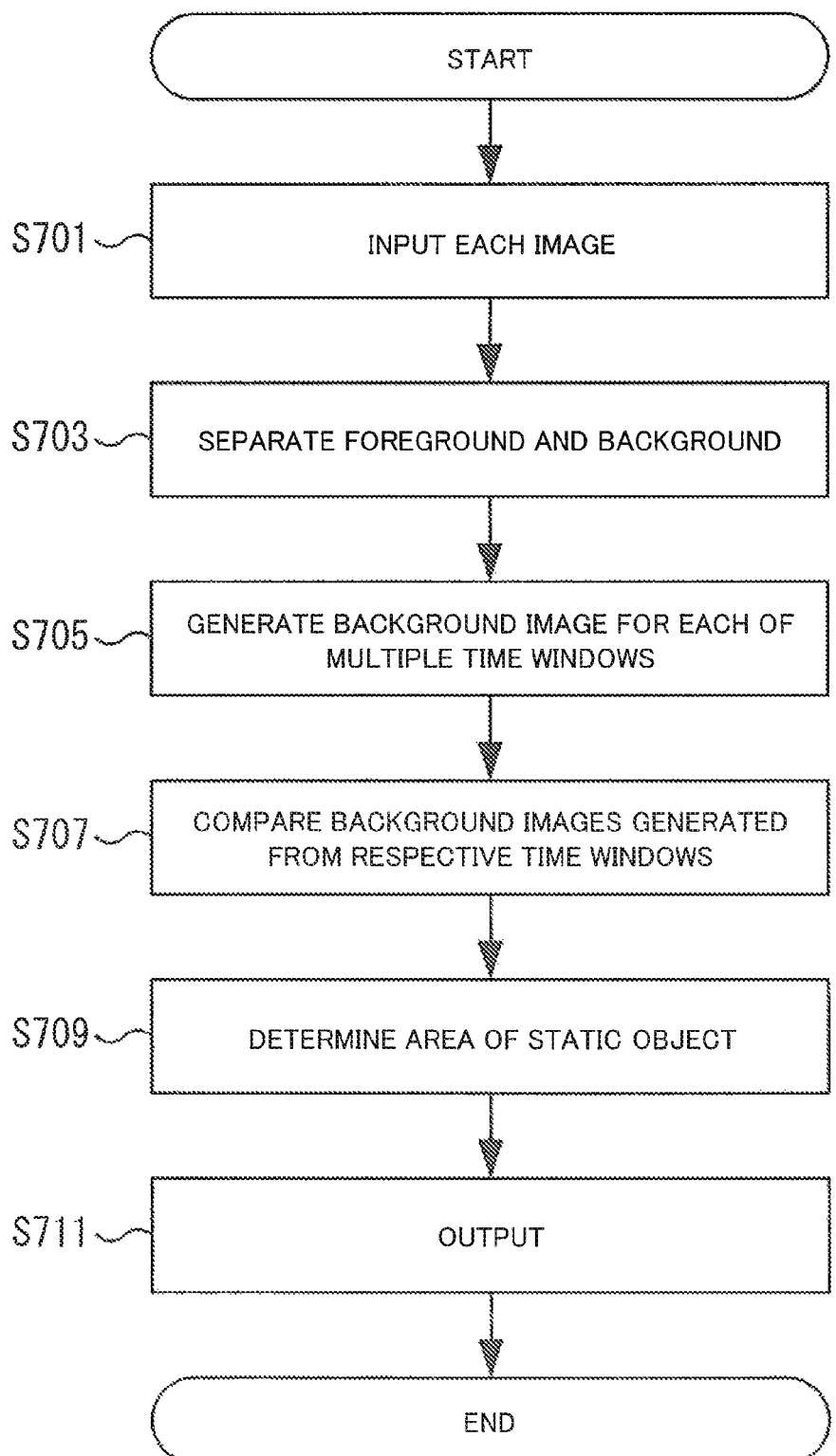
FIG. 7 is a flowchart illustrating a flow of a process carried out by an information processing server illustrated in FIG. 1.

Next, as illustrated in FIG. 6, assume a case including a person standing still from 10 minutes before to one minute before the current time point and a person standing still from six minutes before to five minutes before the current time point.

Here, when background images are generated at the time corresponding to 10 minutes before the current time point, no one is included in the background images generated from the 10-minute time window and the five-minute time window (such background images, which have no difference, may be integrated), whereas a person is included in the background image of the one-minute time window. In this way, it can be understood that the person standing still 10 minutes before the current time point is detected as a person standing still for one minute at the time corresponding to 10 minutes before the current time point.

When background images are generated five minutes before the current time point, the background image generated from the 10-minute time window includes no one, whereas the background image generated from the five-minute time window includes the person standing still from 10 minutes before the current time point. The background image generated from the one-minute time window includes the two people, one standing still from 10 minutes before the current time point and the other standing still from six minutes before the current time point.

The comparison between these background images enables successful detection of the person standing still for five minutes and the person standing still for one minute at the time corresponding to five minutes before the current time point.

At the current time point, the background image generated from a 20-minute time window includes no one, the background images generated from a 10-minute window and a five-minute window include the person standing still from 10 minutes before to one minute before the current time point, and the background image generated from a one-minute time window includes no one.

Since there is no difference between the background image of the 20-minute time window, which is the longest, and the background image of the one-minute time window, which is the shortest, it could be understood that no one is standing still at the current time point.

As described above, the background image generation unit 430 generates background images based on multiple time windows, and the background image comparison unit 450 compares the background image estimated as a genuine background generated from the longest time window and the background images generated on the basis of the other time windows, whereby all static objects having different static time periods are detected. In particular, comparison between background images of multiple time windows enables classification of static objects according to the lengths of their static time periods. For example, static objects may be detected while being classified into those included only in the a background image generated from a time window of five minutes to 15 minutes and those included only in the background image generated from a time window of 15 minutes to 30 minutes. This enables development of an application capable of changing operation to be made to a detected static object depending on the length of its static time.

1.4 Procedure of Process

A procedure of a process carried out by the image processing system 1 will be described below with reference to FIG. 4. FIG. 4 is a flowchart illustrating the procedure of the process carried out by the image processing system 1 according to this exemplary embodiment.

The operation steps to be described below may be performed in any different order or in parallel within a range causing no conflict in the operation, and one or more different steps may be added between any two of the operation steps. Additionally, each step described as a single step for convenience may be performed as multiple steps; multiple steps described separately for convenience may be performed as a single step.

First, the image input unit 410 receives inputs of images obtained by sequentially reading pieces of image data on, for example, images captured by a video camera or a video captured by a video camera and decoding the pieces of image data (S701).

The foreground/background separation unit 420 separates a background area, which is static, and a foreground area, which includes motion, of each of the images input by the image input unit 410 (S703). A generated image of each background area is stored, for example, in the background image storage unit 440.

The background image generation unit 430 generates a background image by use of the background areas identified by the foreground/background separation unit 420 from the respective images captured in each predetermined time window (S705). In this step, the background image generation unit 430 generates background images of multiple respective time windows according to the lengths of the static time periods of static objects to be extracted.

The background image comparison unit 450 compares the background images of the respective time windows generated by the background image generation unit 430 (S707), and the static-area determination unit 460 identifies each area having a difference obtained through the comparison equal to or larger than a threshold value, as an area corresponding to a static object (S709). The output unit 470 outputs information on the area of the static object thus identified and the static time period of the object, to an external module such as an application or a storage medium, for example (S711).

1.5 Hardware Configuration

An example of a hardware configuration for a case where the above-described image processing system 1 is implemented by a computer will be described below with reference to FIG. 8. As mentioned above, the functions of the image processing system 1 may be implemented by multiple information processing devices.

Figure 8:
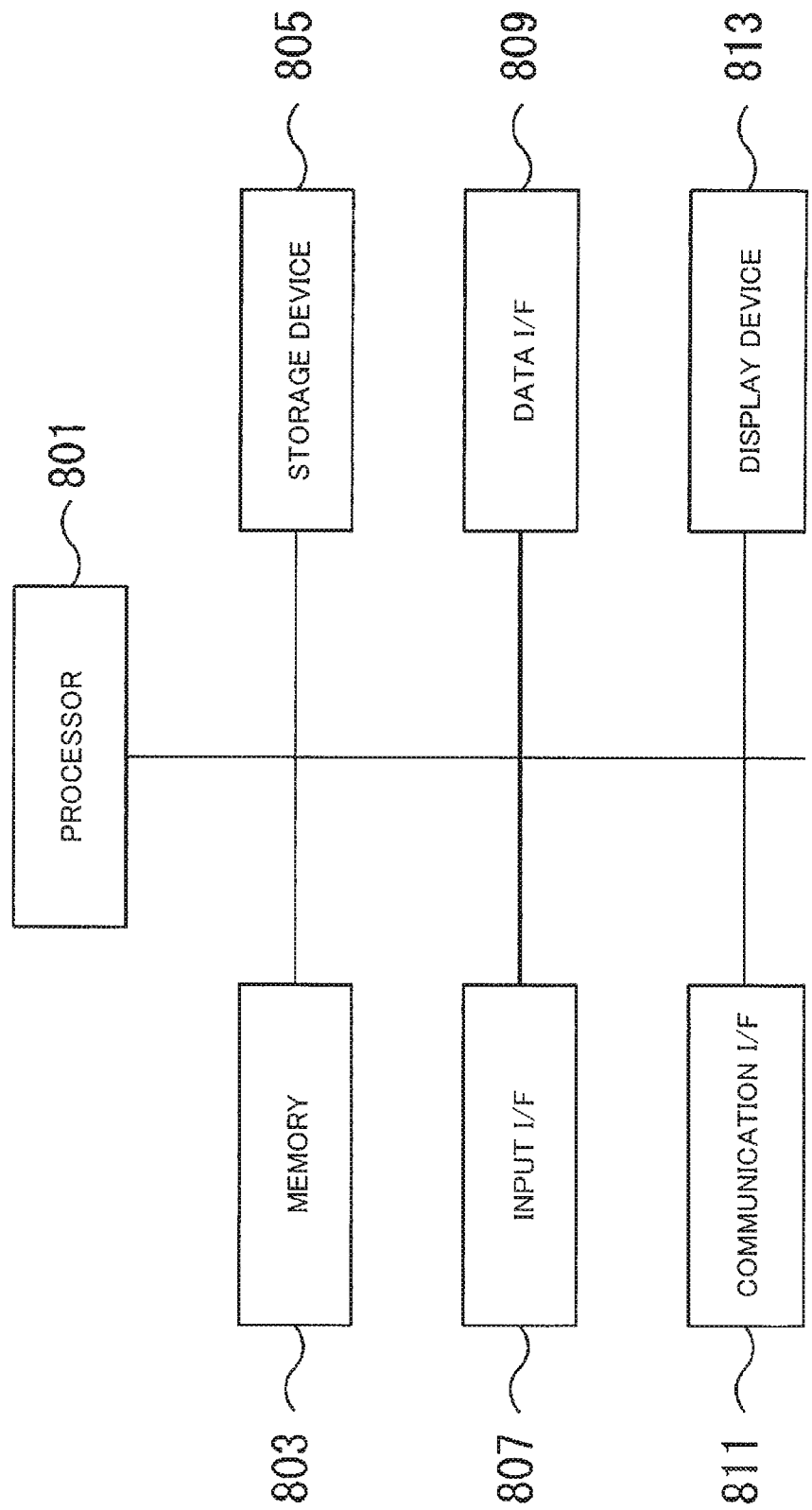
FIG. 8 is a block diagram illustrating a hardware configuration capable of implementing the information processing server illustrated in FIG. 1.

As illustrated in FIG. 8, the information processing system 1 includes a processor 801, a memory 803, a storage device 805, an input interface (I/F) 807, a data I/F 809, a communication I/F 811, and a display device 813.

The processor 801 controls various processes carried out in the image processing system 1 by executing programs stored in the memory 803. For example, the processes related to the image input unit 410, the foreground/background separation unit 420, the background image generation unit 430, the background image comparison unit 450, the static-area determination unit 460, and the output unit 470 may be temporarily stored in the memory 803 and implemented as programs operating mainly on the processor 801.

The memory 803 is a storage medium, such as a random access memory (RAM), for example. The memory 803 temporarily stores the program code of each program to be executed by the processor 801 and data necessary for executing the programs. For example, a storage area of the memory 803 includes a stack area necessary for executing the programs.

The storage device 805 is a nonvolatile storage medium, such as a hard disk or a flash memory, for example. The storage device 805 stores an operating system, various programs for implementing the image input unit 410, the foreground/background separation unit 420, the background image generation unit 430, the background image comparison unit 450, the static-area determination unit 460, and the output unit 470, as well as various kinds of data including the background image storage unit 440. The programs and data stored in the storage unit 805 are loaded into the memory 803 and referred to by the processor 801, when needed.

The input I/F 807 is a device configured to receive inputs from a user. Concrete examples of the input I/F 807 are a keyboard, a mouse, and a touch panel. The input I/F 807 may be connected to the image processing system 1 via an interface, such as a universal serial bus (USB), for example.

The data I/F 809 is a device configured to input data from a device provided outside the information processing server 100. A concrete example of the data I/F 809 is a drive configured to read data stored in various storage media. The data I/F 809 may be provided outside the image processing system 1. In this case, the data I/F 809 is connected to the image processing system 1 via an interface, such as a USB, for example.

The communication I/F 811 is a device for wire or wireless data communication with a device provided outside the image processing system 1, for example, a video camera. The communication I/F 811 may be provided outside the image processing system 1. In this case, the communication I/F 811 is connected to the image processing system 1 via an interface, such as a USB, for example.

The display device 813 is a device configured to display various kinds of information. Concrete examples of the display device 813 are a liquid crystal display and an organic electro-luminescence (EL) display. The display device 813 may be provided outside the image processing system 1. In this case, the display device 813 is connected to the image processing system 1 via a display cable, for example.

1.6 Effects According to Present Exemplary Embodiment

As described above, a moving area (foreground area) and a static area (background area) of each input image are first separated, and a background image is generated on the basis of the static areas of respective images captured in each time window. This reduces detection failure and erroneous detection likely to be caused in an area where movement constantly occurs and is integrated into the background.

In the technique according to this exemplary embodiment, static objects are detected on the basis of multiple time windows that can be set appropriately. This enables extraction of static objects having different static time periods and classification of static objects according to the lengths of their static time periods.

In sum, the image processing system 1 according to this exemplary embodiment can appropriately detect static objects.

1.7 Example

A concrete example of the process carried out by the image processing system 1 according to this exemplary embodiment will be described below. This example assumes a case of extracting a left-behind bag when the image processing system 1 illustrated in FIG. 4 is employed for a system of a security camera capturing images of a street where the lighting state significantly changes according to weather and time of the day.

Figure 9:
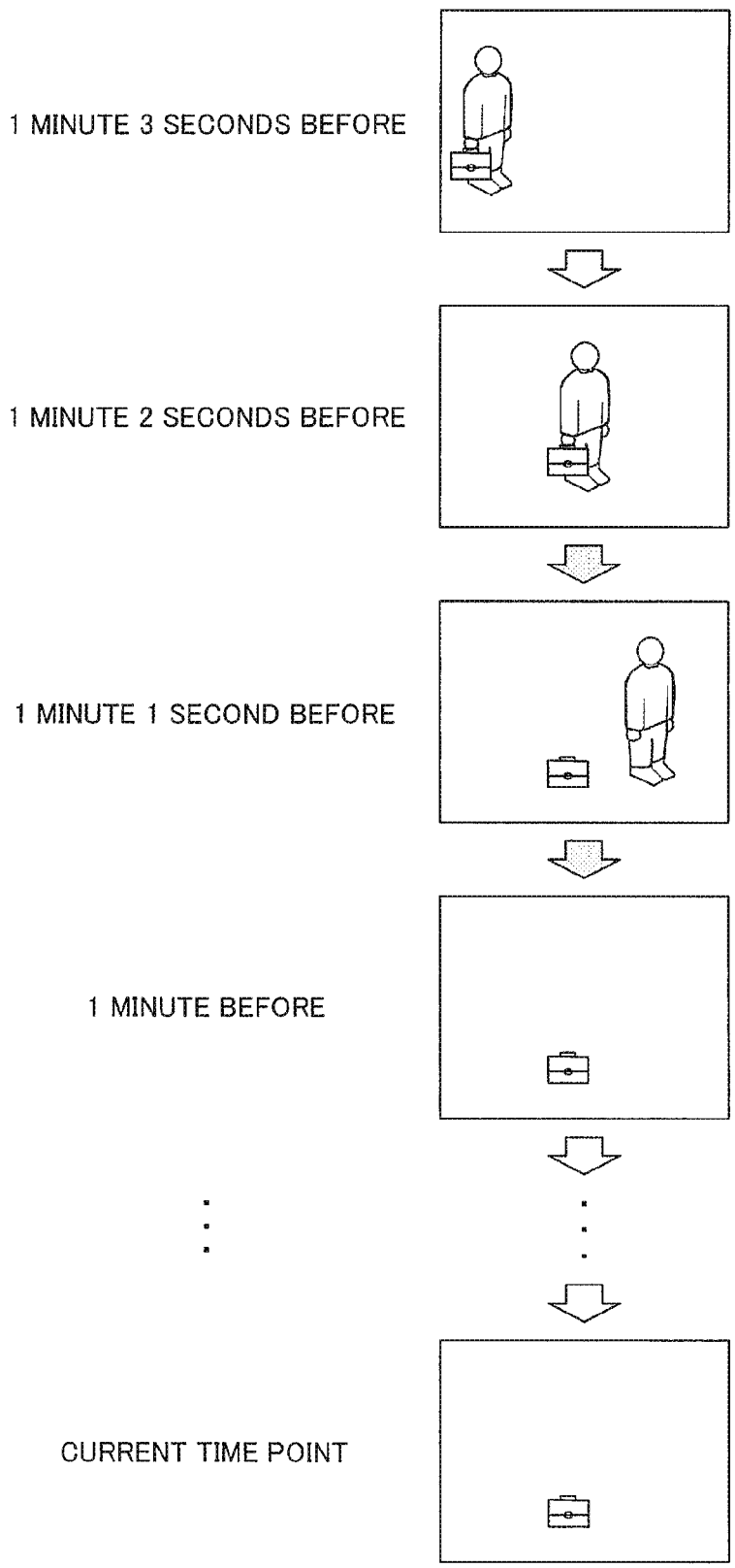
FIG. 9 is a diagram illustrating input images according to an example.

FIG. 9 is a diagram illustrating input images input in this example. FIG. 9 illustrates a state in which a bag is left behind. In FIG. 9, a person carrying a bag enters the angle of view of the security camera installed in the street, at the time corresponding to one minute three seconds before the current time point. The person moves forward and then leaves the bag at the time corresponding to one minute one second before the current time point and then moves out from the frame at the time corresponding to one minute before the current time point. The bag is left behind from one minute one second before the current time point to the current time point.

The image input unit 410 sequentially receives inputs of frame images included in the video input by the security camera installed in the street. In this example, the image input unit 410 receives inputs of the frame images illustrated in FIG. 9.

The foreground/background separation unit 420 separates a foreground area and a background area of each input image input by the image input unit 410. As illustrated in FIG. 9, in this example, the bag is standing still from one minute one second before the current time point, and hence the bag, which is separated as a foreground until this time point, is separated as a background area from the time point on.

The background image generation unit 430 generates a background image by use of the background area (the image of the static area) extracted by the foreground/background separation unit 420 and the background areas of the images captured in each of multiple predetermined time windows, the background areas being stored in the background image storage unit 440.

The background image generation unit 430 generates a background image, for example, on the basis of each of the time window corresponding to 30 seconds, to five minutes, and to 10 minutes. In this case, the background image generation unit 430 generates the background image of the 30-second time window by use of the background area extracted by the foreground/background separation unit 420 and the background areas generated in the past 30 seconds and stored in the background image storage unit 440. Similarly, the background image generation unit 430 generates the background image of the five-minute time window by use of the background area extracted by the foreground/background separation unit 420 and the background areas generated in the past five minutes. The background image generation unit 430 generates the background image of the 10-minute time window in a similar manner.

In this exemplary embodiment, the background image of the 10-minute time window is assumed to consist of a genuine background. Images captured by such a security camera installed in a street are largely affected by lighting variations, which are caused, for example, by changes in brightness according to weather and time of the day. Due to this influence, even the background image representing a genuine background changes with time without being stable. For this reason, using a fixed background image as a genuine background image causes frequent erroneous detection of a remaining object (the bag in this example). In this example, however, since a background image is sequentially generated, a remaining object can be accurately detected with little influence of lighting variations.

The background image storage unit 440 stores the images of the background areas of the input images corresponding to each predetermined time period, the background areas being sequentially extracted by the foreground/background separation unit 420. In this example, background areas representing only the genuine background are stored for the time period from 10 minutes before to one minute and one second before the current time point, and background areas including the bag in addition to the genuine background are stored for the time period from one minute one second before the current time point to the current time point.

The background image comparison unit 450 compares the background images of the 10-minute time window and the five-minute time window each consisting of the genuine background, with the background image of the 30-second time window including the bag with the genuine background.

The static-area determination unit 460 determines the area having a difference exceeding a threshold value from the result of the comparison between the background images of the 10-minute and five-minute time windows and the background image of the 30-second time window, as a static area, i.e., the area including the bag. If a fixed background image representing a daytime background as an image consisting of the genuine background and the current time point is in the evening, the fixed background image and the image of the current time point have a large difference due to lighting variations, which causes frequent erroneous detection.

The output unit 470 outputs information on the pixel area including the bag, to an external module.

As described above with this example, it is possible to accurately detect a remaining object with little influence of lighting variations. This is because the image processing system 1 according to this exemplary embodiment sequentially generates a background image from each of multiple different time windows by use of multiple background areas, instead of using a fixed background image, and compares the generated background images. Employing this exemplary embodiment for a monitoring system enables detection of people crowding, hanging around, and writing graffiti as well as detection of a remaining object (left behind) on a street.

Variations of a background image of a long time window (long-term background model) may be generated in advance, for example, a background image may be hourly generated for a state under the sun and a state in the shade, and stored in the background image storage unit 440 or an unillustrated storage unit. In this case, the image processing system according to this exemplary embodiment may generate a background image for a medium-term window and a background image for a short-term window sequentially, and select and use, with respect to a background image for a long time window, a model appropriate for the state among those stored in the storage unit. In this way, this exemplary embodiment efficiently operates also in a case where certain changes occur at a part of a background area, such as advertisement displayed by a digital signage or a door of an elevator, in addition to a case with lighting variations.

2 Second Exemplary Embodiment

Figure 10:
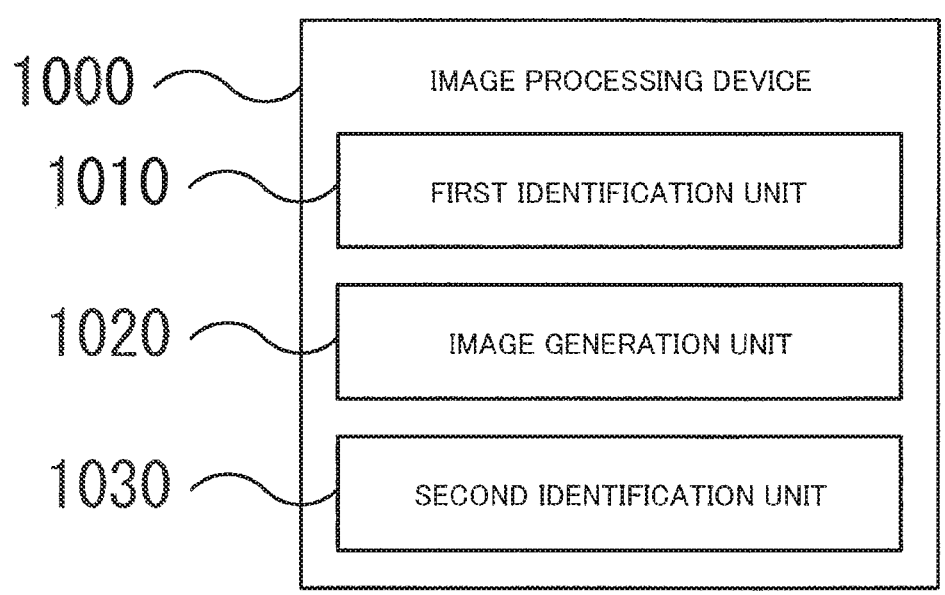
FIG. 10 is a functional block diagram illustrating a schematic configuration of a monitoring device according to a second exemplary embodiment.

A second exemplary embodiment will be described below with reference to FIG. 10. FIG. 10 is a block diagram illustrating a functional configuration of an image processing system 1000. As illustrated in FIG. 10, the image processing system 1000 includes a first identification unit 1010, an image generation unit 1020, and a second identification unit 1030.

The first identification unit 1010 identifies a static area, in which no motion is included, from an input image captured at each of multiple time points.

The image generation unit 1020 generates a first image on the basis of static areas of input images captured in a first time span from a processing time point and generates a second image on the basis of static areas of images captured in a second time span from the processing time point.

The second identification unit 1030 compares the first image and the second image and identifies an area having a difference on the basis of the comparison result.

This implementation enables the image processing system 1000 according to this exemplary embodiment to appropriately detect a static object.

3 Supplementary Matters

The configurations of the above-described exemplary embodiments may be combined or partially switched. In addition, the configuration of the present invention is not limited only to the above-described exemplary embodiments, and various changes may be made thereto within a range not departing from the gist of the present invention.

Part or all of the above-described exemplary embodiments may be described as is described below in the supplementary notes, while not being limited thereto. A program of the present invention may be any program as long as causing a computer to perform the operations described in the above-described exemplary embodiments.

(Supplementary Note 1)
An image processing system including: a first identification unit configured to identify a static area from an input image captured at each of a plurality of time points; an image generation unit configured to generate a first image by using the static areas of respective input images captured in a first time span from a processing time point and generate a second image by using the static areas of respective images captured in a second time span from the processing time point; and a second identification unit configured to compare the first image and the second image and identify an area having a difference.

(Supplementary Note 2)
The image processing system according to Supplementary Note 1, wherein the second time span is longer than the first time span.

(Supplementary Note 3)
The image processing system according to Supplementary Note 1 or 2, wherein the image generation unit generates a plurality of images including the first image and the second image for each of a plurality of respective time spans including the first time span and the second time span, and wherein the second identification unit compares the plurality of images.

(Supplementary Note 4)
The image processing system according to any one of Supplementary Notes 1 to 3, wherein the image generation unit generates the first image and the second image by calculating any one of a mode, a median, and an average of values of each pixel of the static areas of the respective input images captured in each of the first time span and the second time span from the processing time point.

(Supplementary Note 5)
The image processing system according to any one of Supplementary Notes 1 to 4, wherein each of the first time span and the second time span is set at any time span.

(Supplementary Note 6)
An image processing method in which an image processing system performs: a step of identifying a static area from an input image captured at each of a plurality of time points; a step of generating a first image by using the static areas of the respective input images captured in a first time span from a processing time point and generating a second image by using the static areas of the images captured in a second time span from the processing time point; and a step of comparing the first image and the second image and identifying an area having a difference.

(Supplementary Note 7)
The image processing method according to Supplementary Note 6, wherein the second time span is longer than the first time span.

(Supplementary Note 8)
The image processing method according to Supplementary Note 6 or 7, wherein a plurality of images including the first image and the second image are generated for a plurality of respective time spans including the first time span and the second time span, and the plurality of images are compared.

(Supplementary Note 9)
The image processing method according to any one of Supplementary Notes 6 to 8, wherein the image generation unit generates the first image and the second image by calculating any one of a mode, a median, and an average of values of each pixel of the static areas of the respective input images captured in each of the first time span and the second time span from the processing time point.

(Supplementary Note 10)
The image processing method according to any one of Supplementary Notes 6 to 9, wherein each of the first time span and the second time span is set at any time span.

(Supplementary Note 11)
A program causing a computer to carry out: a process of identifying a static area from an input image captured at each of a plurality of time points; a process of generating a first image by using the static areas of the respective input images captured in a first time span from a processing time point and generating a second image by using the static areas of the images captured in a second time span from the processing time point; and a process of comparing the first image and the second image and identifying an area having a difference.

(Supplementary Note 12)

The program according to Supplementary Note 11, wherein the second time span is longer than the first time span.

(Supplementary Note 13)

The program according to Supplementary Note 11 or 12, wherein a plurality of images including the first image and the second image are generated for a plurality of respective time spans including the first time span and the second time span, and the plurality of images are compared.

(Supplementary Note 14)

The program according to any one of Supplementary Notes 11 to 13, wherein the image generation unit generates the first image and the second image by calculating any one of a mode, a median, and an average of values of each pixel of the static areas of the respective input images captured in each of the first time span and the second time span from the processing time point.

(Supplementary Note 15)

The program according to any one of Supplementary Notes 11 to 14, wherein each of the first time span and the second time span is set at any time span.

The present application claims priority based on Japanese Patent Application No. 2013-115544, filed on May 31, 2013, the entire disclosure of which is incorporated herein.

REFERENCE SIGNS LIST

1: image processing system, 100: information processing server, 410: image input unit, 420: foreground/background separation unit, 430: background image generation unit, 440: background image storage unit, 450: background image comparison unit, 460: static-area determination unit, 470: output unit, 801: processor, 803: memory, 805: storage device, 807: input interface, 809: data interface, 811: communication interface, 813: display device, 900: image processing system, 910: first identification unit, 920: image generation unit, 930: second identification unit

The invention claimed is:

1. An image processing system comprising:
a memory storing instructions; and
at least one processor configured to execute the instructions to:
identify static areas from input images captured at a plurality of time points, wherein, in the static areas, the input images include motion indicating a value smaller than a threshold value;
generate a first image using the static areas of respective input images captured in a first time span from a processing time point, a second image using the static areas of respective input images captured in a second time span from the processing time point, and a third image using the static areas of respective input images captured in a third time span from the processing time point;
compare the first image and the second image and identify an area having a difference; and
classify static objects included in the input images according to a length of a static time period, based on a comparison of the first image, the second image, and the third image.

2. The image processing system according to claim 1, wherein the second time span is longer than the first time span.

3. The image processing system according to claim 1, wherein the at least one processor is further configured to execute the instructions to:
generate a plurality of images including the first image, the second image, and the third image for a plurality of respective time spans including the first time span, the second time span, and the third time span; and
compare the plurality of images.

4. The image processing system according to claim 1, wherein the first image, the second image, and the third image are generated by calculating any one of a mode, a median, and an average of values of pixels of the static areas of the respective input images.

5. An image processing method, comprising:
identifying static areas from input images captured at a plurality of time points, wherein, in the static areas, the input images include motion indicating a value smaller than a threshold value;
generating a first image using the static areas of the respective input images captured in a first time span from a processing time point, a second image using the static areas of the input images captured in a second time span from the processing time point, and a third image using the static areas of respective input images captured in a third time span from the processing time point;
comparing the first image and the second image and identify an area having a difference; and
classifying static objects included in the input images according to a length of a static time period, based on a comparison of the first image, the second image, and the third image.

6. A non-transitory computer readable recording medium which stores a set of instructions which, when executed by a computer, causes the computer to perform an image processing method, the method comprising:
identifying static areas from input images captured at a plurality of time points, wherein, in the static areas, the input images include motion indicating a value smaller than a threshold value;
generating a first image using the static areas of the respective input images captured in a first time span from a processing time point, a second image using the static areas of the input images captured in a second time span from the processing time point, and a third image using the static areas of respective input images captured in a third time span from the processing time point;
comparing the first image and the second image and identify an area having a difference; and
classifying static objects included in the input images according to a length of a static time period, based on a comparison of the first image, the second image, and the third image.

7. The image processing method according to claim 5, wherein the second time span is longer than the first time span.

8. The image processing method according to claim 5, wherein
a plurality of images including the first image, the second image, and the third image are generated for a plurality of respective time spans including the first time span, the second time span, and the third time span, and
the plurality of images are compared.

9. The image processing method according to claim 5, wherein the first image, the second image, and the third image are generated by calculating any one of a mode, a median, and an average of values of pixels of the static areas of the respective input images.

* * * * *

UNITED STATES PATENT AND TRADEMARK OFFICE
CERTIFICATE OF CORRECTION

PATENT NO. : 9,953,240 B2
APPLICATION NO. : 14/894143
DATED : April 24, 2018
INVENTOR(S) : Yukie Ebiyama It is certified that error appears in the above-identified patent and that said Letters Patent is hereby corrected as shown below:

In the Claims

Column 15, Line 38, Claim 1 should read as follows:
An image processing system comprising:
    a memory storing instructions; and
    at least one processor configured to execute the instructions to:
    identify static areas from input images captured at a plurality of time points, wherein, in the static areas, the input images include motion indicating a value smaller than a threshold value;
    generate a first image using the static areas of the respective input images captured in a first time span from a processing time point, a second image using the static areas of respective input images captured in a second time span from the processing time point, and a third image using the static areas of respective input images captured in a third time span from the processing time point;
    compare the first image and the second image and identify an area having a difference; and
    classify static objects included in the input images according to a length of a static time period, based on a comparison of the first image, the second image, and the third image.

Signed and Sealed this
Eighteenth Day of March, 2025

Coke Morgan Stewart
*Acting Director of the United States Patent and Trademark Office*